June 14, 1966 P. H. TAYLOR 3,256,005
LOW-COST LIQUID SPRING
Filed May 13, 1963 6 Sheets-Sheet 4
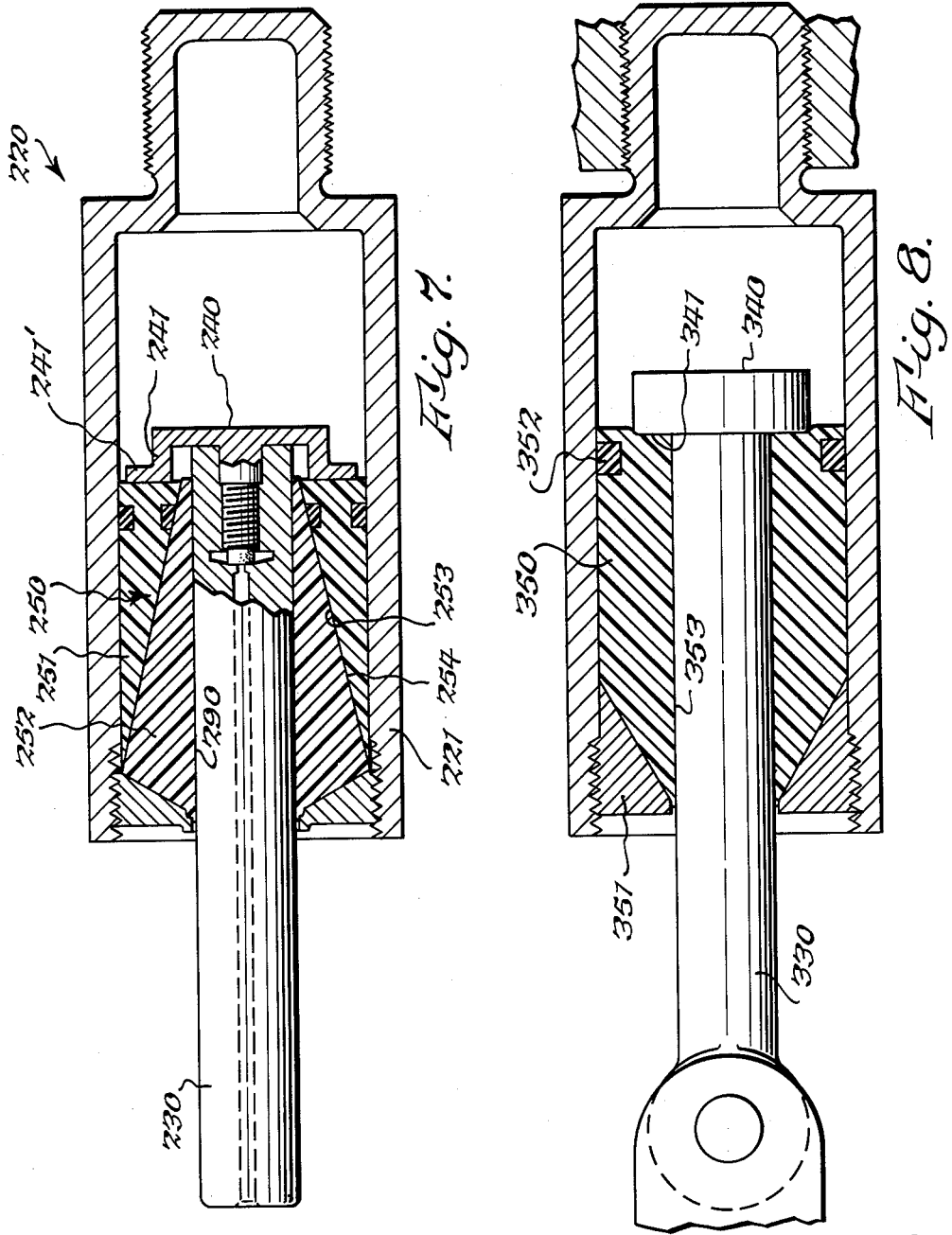
INVENTOR.
Paul H. Taylor

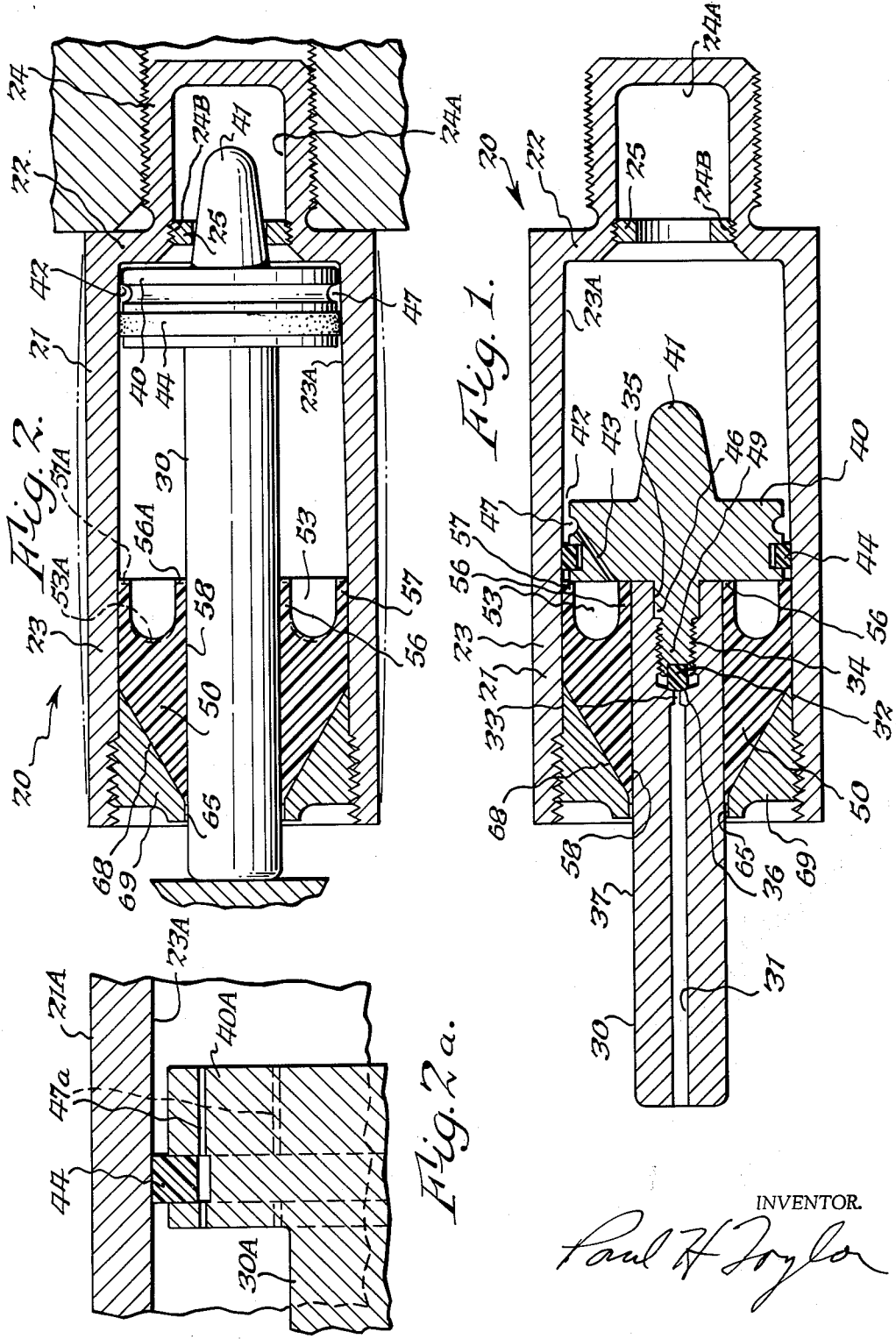

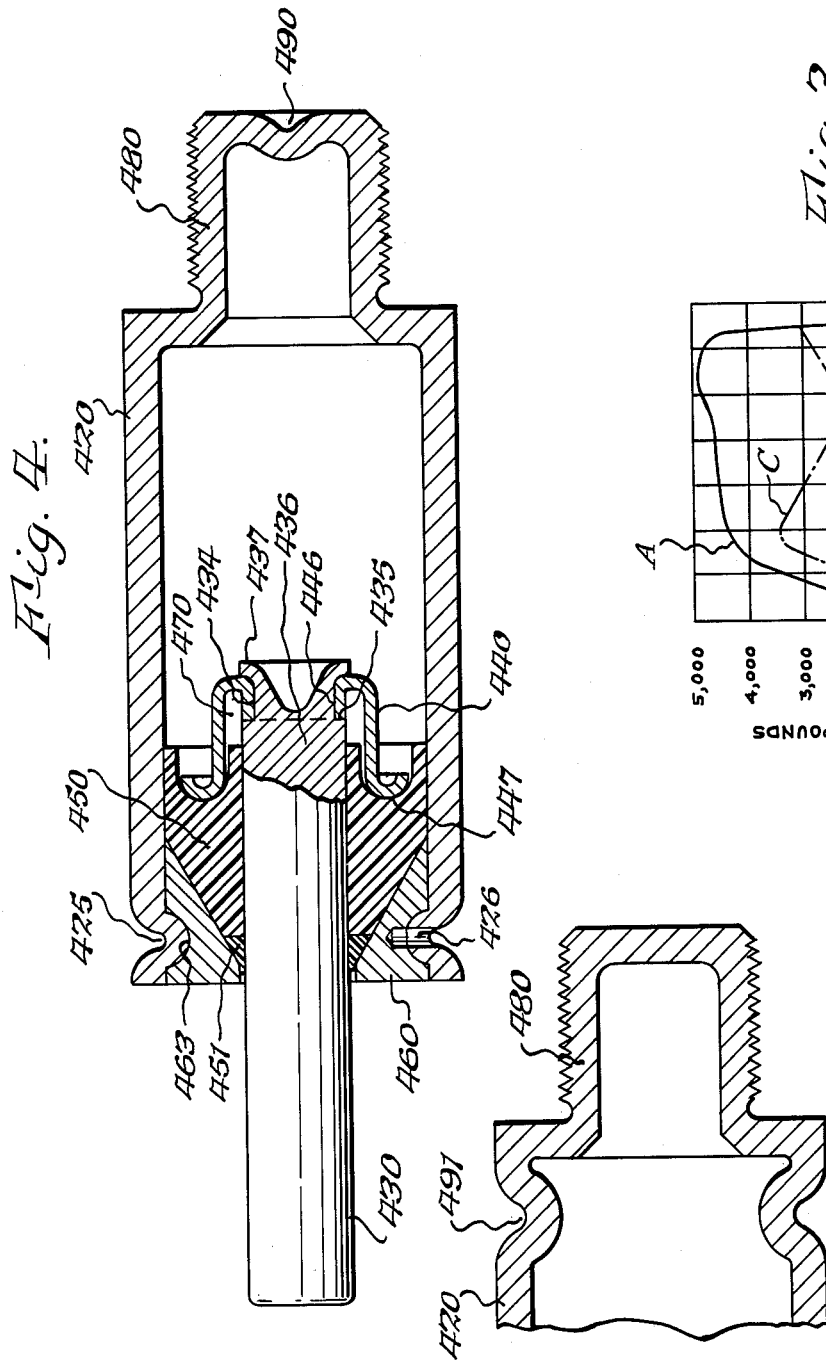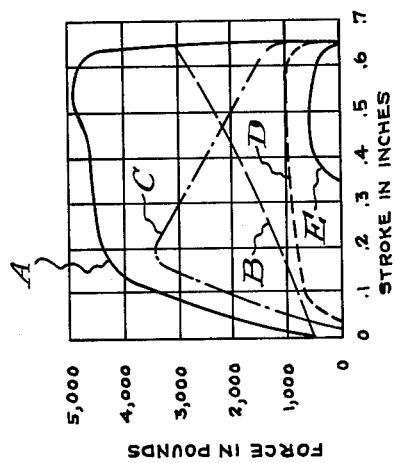

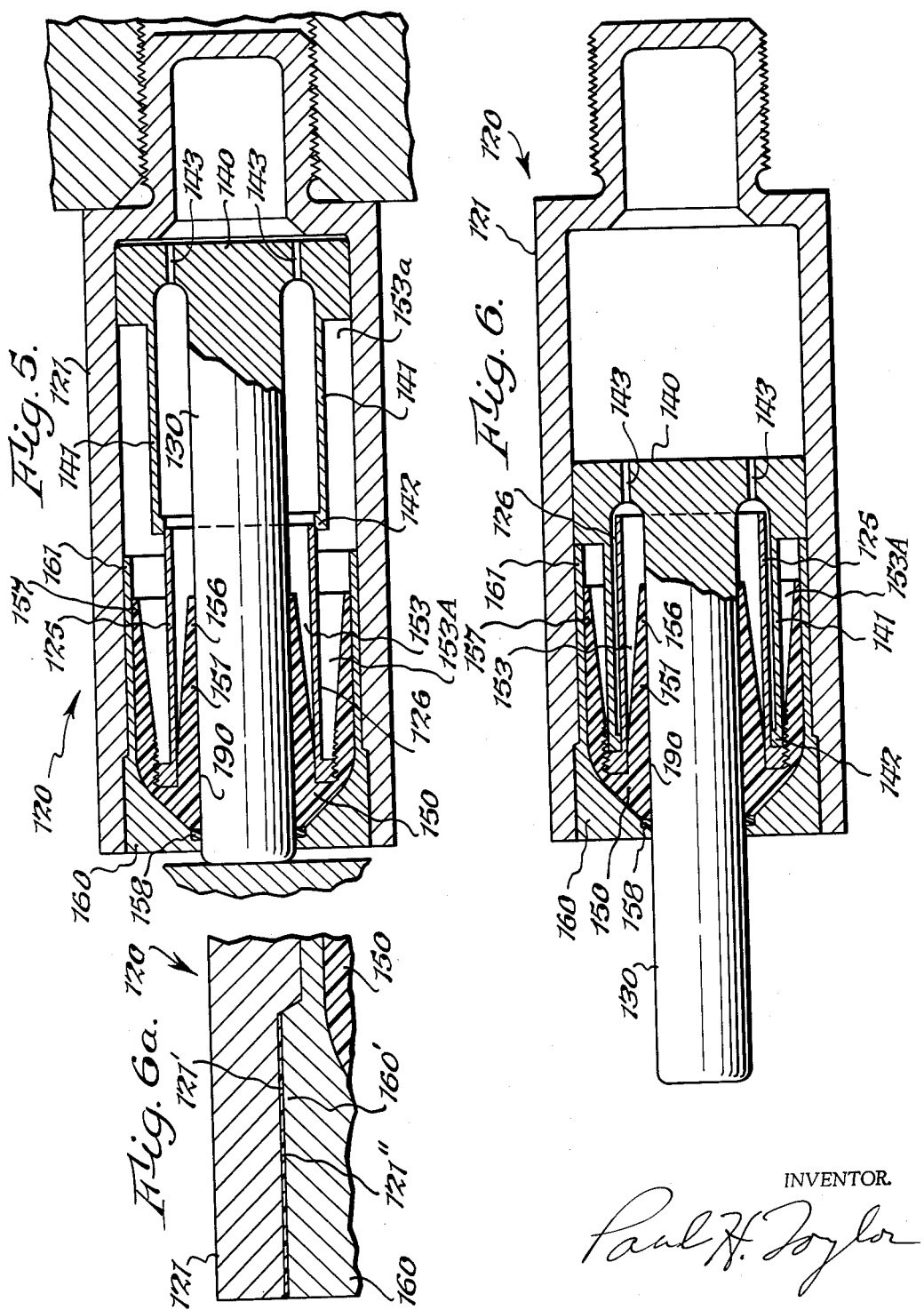

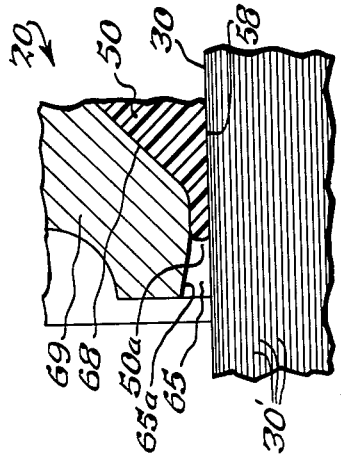
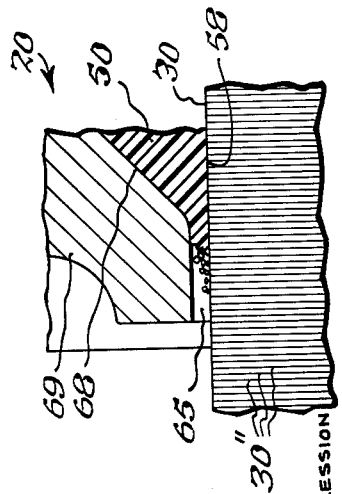
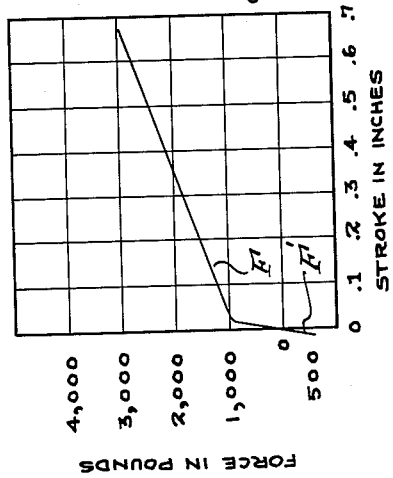
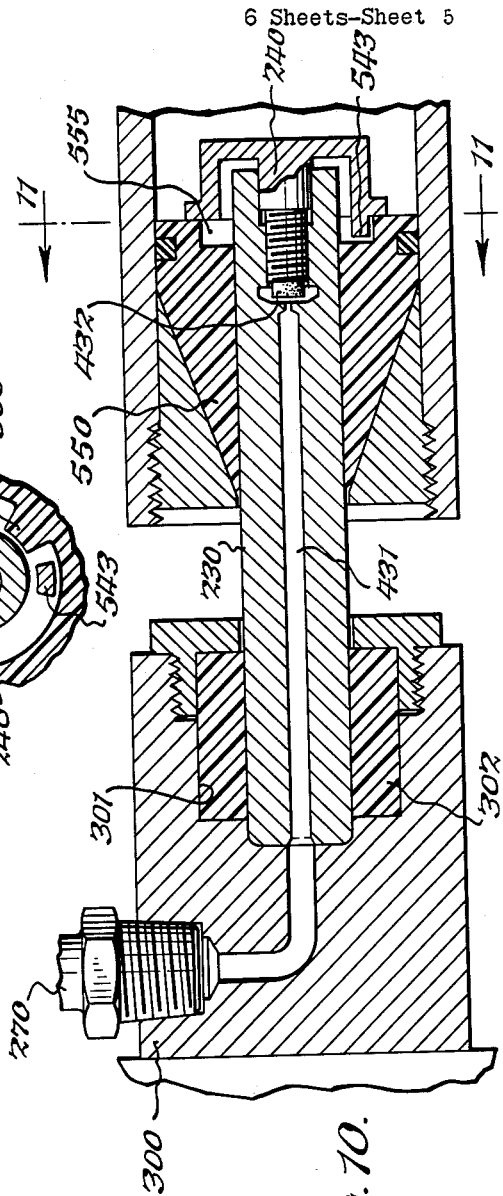

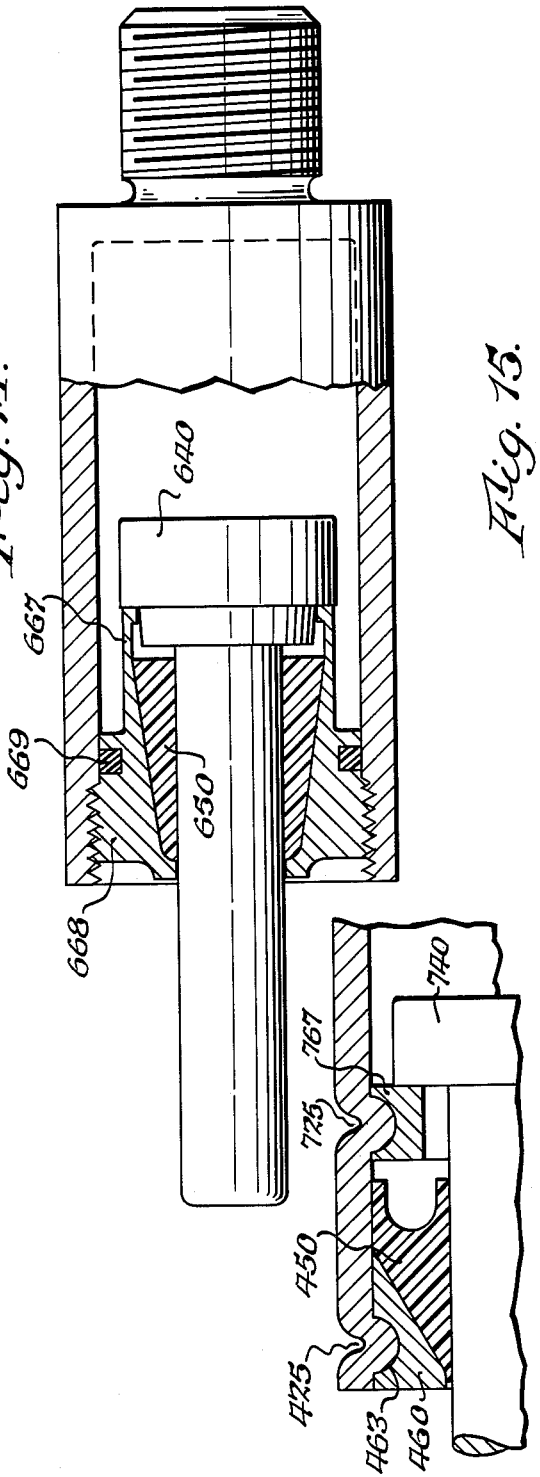
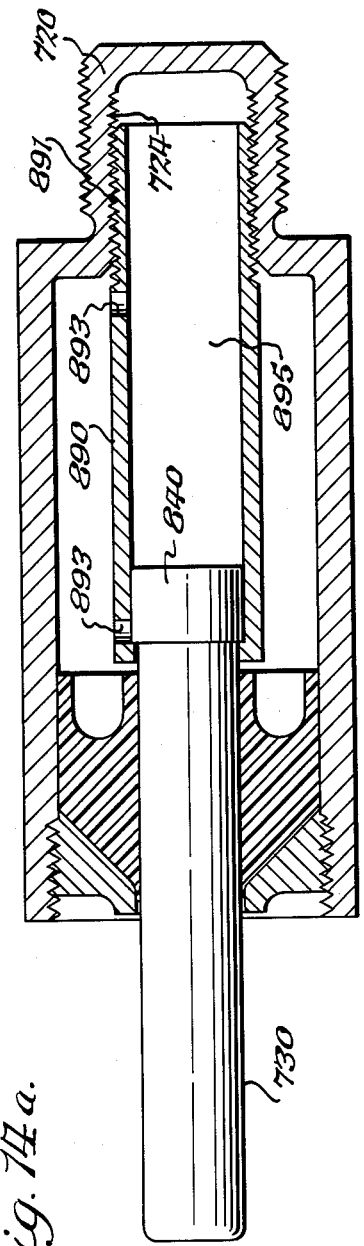

United States Patent Office 3,256,005
Patented June 14, 1966

3,256,005
LOW-COST LIQUID SPRING
Paul Hollis Taylor, Grand Island, N.Y., assignor to Tayco Developments, Inc., North Tonawanda, N.Y., a corporation of New York
Filed May 13, 1963, Ser. No. 284,769
14 Claims. (Cl. 267—64)

This invention is related generally to that class of device known as liquid springs, but, characterized by simple low-cost design providing reliable sealing means whereby said device lasts as long and can be produced commercially competitive with the plurality of coil springs they replace.

Many of the claimed or disclosed devices of the prior art have generally been drawn to the most critical of all elements related to such devices, that is the sealing of a liquid in the spring. The remainder of the art relates to the design of structure to compress or contain high pressure liquid. In my Patent 2,909,398 I illustrate a sealing method using a plastic tire seal for wear and sealing to provide the long leak-free life required to take care of the resiliency requirements due to deflection of relative components.

In my subsequent patent application filed February 23, 1962 Serial No. 175,113, now Patent No. 3,186,702, granted June 1, 1965, I have utilized again plastics of Teflon, nylon and elastomers, used in combination, and called a chemical growth seal to provide the necessary seal compressibility pressure on the wall by the elastomer, nylon, Teflon combination, from compatible chemical growth to take care of the deflection of cylinder walls while simultaneously providing a pressure in excess of maximum liquid pressure to seal the liquid whereby the seal always remains substantially in high pressure sealing engagement thereof.

I have also developed a method of finishing metallic elements linearly to be used whenever elastomers or plastics are utilized therewith for high pressure sealing whereby the scratch pattern or finish lines on the surface is reduced to .5 micro-finish, finished in the direction of seal travel. This finish is caused to be parallel to the motion of seal movement so as to reduce the necessity for elastomers and plastics going over hills and valleys, as such elastomers are characterized by the inability to have fast memories to restore the sealing contact in a valley after they have passed over a hill of the metallic parts. In my Patent 2,909,398 I illustrate a method of applying a plastic to a spring member for the similar purpose of reducing the molecular gap between mating surfaces and providing the bearing characteristics between relatively sliding members whereby the seal can be supported and leakage can be eliminated. All of these prior patents are indicated as a source of liquid spring improvements, and in fact, each of the patents referred to has improved the reliability and life of liquid springs but have heretofore not been elements of cost reduction so important for major fields such as the door closure, transportation, machine and die fields, etc.; where low-cost as well as long life are of paramount importance. This invention disclosed herein achieves both objectives.

Heretofore, there have been approximately five classes of seals used in liquid springs.

Class 1: This seal has been the familiar O ring, Quad ring or Chevron elastomer which is intensified by internal pressure causing sealing elements to expand by internal pressure against the wall of the spring to seal and compensate for deflection and changes of pressures while the unit is stroked.

Class 2: This sealing device has been that of the mechanical intensification seal first covered by Bridgman in American Acadamy of Arts and Sciences in which Bridman accomplishes sealing because of the hydraulic intensification against a soft metallic flowable sealing element. This was largely a one operation laboratory sealing device.

Class 3: This Bridgman seal element was improved further by Dowty of England who employed a novel method using wire gauze or area reducing plugs of a metallic nature going through an elastomer and reducing its area while the part itself with the plug subjected the seal to intensification of a higher pressure whereby sealing occurs on a female seal on a shaft and the cylinder interior after the elastomer itself was intially preloaded. This seal has later been improved by the introduction of a Teflon tire seal in a female use similar to the one shown in my Patent 2,909,398 but used internally on an external rod surface which has improved the wearing and friction characteristics of the Dowty seal whereby the seal accomplished longer life as in my noted patent. It has been suggested that a Dowty seal employing mechanically preloaded solid plastics such as nylon, Teflon, and Delrin might also be used effectively, but all of these sealing elements comprise a relatively high-cost approach to the sealing of liquid springs for volume low-cost production.

Class 4: The relatively newer seal invented and disclosed by me in patent application Serial Number 175,-113, filed February 23, 1962 employs the chemical growth of an elastomer inside a liquid spring from an additive in the liquid and chemically accomplishes the intensification of seal pressure greater than the liquid it contains in a low-cost and relatively inexpensive manner, whereby the cost of the seals and springs and their reliability could be improved tremendously. However, the spring was still relatively high cost as compared with the old familiar coil spring built on automatic machines. It is to be the replacement of the coil spring of production by a low-cost liquid spring that this application is drawn.

Class 5: To which this patent is directed embraces a seal design having a long leakage path or pressure gradient, plus employing a method of subjecting a single homogeneous intensifying seal to an elastic loading or interference coupled with a continuous intensification irrespective of temperature to which the unit is subjected, a seal which further replaces its own wear by mechanical cold flow of the plastic, to inhibit leakage through wear by mechanically replacing the seal material. It further provides a low-cost seal which in turn makes possible a low-cost reliable spring of few parts.

In the Bridgman or Dowty sealing configurations, area is removed from the seal to make it less than the intensifying piston area. In Bridgman, a differential area piston is used. In Dowty pins are injected through holes in the elastomer which accomplish area changes. I have built many seals of both types and found the cost prohibitive except in high-cost applications. These seals are generarally mechanically preloaded by mechanical compressors. A major problem with such a seal is that the variations in thermal expansion of the elastomer, as compared with the high strength steel cylinder, results in loss of preloaded pressure in cold weather and a high preload in warm weather, which in the first instance causes leakage and in the second, seal wear. In addition, as normal seal wear occurs due to cycle life the seal cannot replace its own wear except with service which restores the initial preload on the elastomer. My invention herein described is intended to also correct the above deficiencies.

It has long been felt by the applicant that gains in cost reduction of liquid springs would come through the principle of cold extruding or cold working of steel of alloy nature for liquid spring cylinders. A huge hydraulic, or as I prefer, a compressibility press, with which I have conducted experiments, has indicated that if higher alloy steels in a ductile condition are struck with sufficient velocity with punches of carbide or the other materials of sufficient strength to withstand a high impact load that the alloy steel can be made to work like tooth paste forming in one backward extrusion the shape of a liquid spring cylinder. Such a device is shown in my co-pending patent application Serial No. 144,955, filed October 13, 1961, now Patent No. 3,193,875, granted July 13, 1965, which is related to a high speed extrusion press employing the principle of liquid compressibility to advance the ram at an extremely high rate of acceleration to a high velocity. Experiments with springs have shown because of the basic low piston mass situation related to the energy available from the compressed molecule that ram speeds of 200 inches per second are obtained. Such liquid spring presses have the capability to provide low-cost liquid springs by the extrusion of high strength alloy steel members required for the cylinders. This is lower in manufacturing cost than present mechanical spring coilers. My seal is intended to work with such extruded cylinders. I further disclose methods of cold working the cylinder to retain an end closure, preload stop, and volume reduction for accomplishing preload or leakage replenishment.

For short run special liquid spring or spring shock applications I have evolved an electrolytic honing. The method accomplished the low-cost finishing of liquid springs by electrolysis with which this simple spring and seal configuration can be finished for seal compatibility.

Now in the invention disclosed here, I have found a method by which with this low cost extrusion or honing the sealing can be accomplished cheaply with very simple low cost elements which combined with the method for extruding or finishing cylinders noted above, provides methods whereby liquid springs can be mass produced as cheaply as coil springs and the degree of reliability with respect to sealing makes them equal to many of the coil springs they seek to replace except in *very longest of life applications* to which coil springs are currently being subjected.

One of the principal methods by which this is accomplished is the replacement of the former complicated sealing element with a simple plastic element adapted to low cost molding or machining with high production equipment which is caused to be the seal intensifier and wearing surface, which, when combined with a cylinder of proper stress levels for inward intensification, accomplishes the desired result of intensifying the pressure on a seal member whereby leakage cannot occur since its pressure at all times exceeds the internal pressure of the spring which it is sealing.

Since liquid springs and spring shocks have a universal market wherever springs or shocks are used the concepts of this invention of low-cost sealing in combination with low-cost fabrication means are combined in endless combinations depending on the end market use. Thus in die springs of ¾ inch diameter, 2½ inch length and .050 wall thickness, 2,000 pound springs, the low-cost seal combined with low-cost extruded cylinders, rolled retainers and ductile preloading are essential to that market which requires a low-cost throwaway simply serviced unit. However, in large aerospace requirements, say employing wall of 2 inch thickness and a 12 inch diameter of 1,000,000 pounds and combining the shock features the ability to service the unit to a higher preload say for a heavier second stage missile support requires the flexibility of variable loading on site and the ability to change dampening or liquids by dissembly and charging ports. Simple low-cost filling or charging means must herein be provided.

Also certain zero impact springs, requiring low costs, utilize a slight modification of the seal piston combinations to utilize the seal elasticity as a counterbalancing spring to the liquid spring.

Similarly, when used as an automobile suspension, it may be desirable to maintain hydrostatic pressure on the low memory seal irrespective of the direction of shock absorber motion to reduce leakage in a low friction application.

A vehicle liquid spring system basically supports the vehicle on a ⅜ shaft 6" long because of high liquid pressures of compressibility. Thus the column strength of the small diameter shaft is critical. Bending or deflecting of the column must be followed by the seal or leakage will occur. This seal provides this feature.

It will thus be seen that the universal need for a low cost liquid spring in such widely divergent industries as dies, machine tools, transportation, health and medicine, aerospace, etc. require a low-cost reliable sealing means, through cooperating elements may of necessity be widely divergent.

All the above uses have a commonality of reliable low cost sealing and construction although detail construction used therewith may vary greatly. A plurality of illustrations therefore, are required to demonstrate the low-cost construction as applied to divergent uses.

In summary of the above, a commonality of structure for low-cost liquid springs, regardless of end use, will be described herein comprising:

(1) A cylinder having at least one end open and characterized by an internal linear surface finish, parallel to the movement of the piston.

(a) Fabrication can be just extrusion or machining and boring and linear lapping depending on volume of production.

(2) A rod piston linear finished for the liquid spring function.

(3) A single seal adapted to seal the linear finished cylinder and piston comprising in combination a self contained U type intensifying section and a conical formed intensified section adapted to provide a sealing pressure greater than the liquid with the angle intended to replace seal material as it wears.

(4) A cooperating cylinder end closure having a mating conical surface of high finish for the seal movement and cold flow extrusion for wear replacement.

The primary object of this invention is to provide a single low-cost seal, piston, chamber, configuration adapted to service widely divergent spring and shock requirements for dies, machine tools, transportation, and aerospace industries.

It is a primary object of this invention to provide a low cost liquid spring capable of mass production at a cost competitive to the coil springs it replaces and of less expense when compared with spring energy devices as they now exist.

It is a related object of this invention to provide a cylinder and a method of sealing a liquid spring which is basically low cost to manufacture for any spring or shock use.

It is a related object of this invention to provide a long leakage path, low cost, low friction seal for liquid springs having high reliability with low friciton.

It is a related object of this invention to provide a seal element also adapted to be the structural support for the piston.

It is a related object of this invention to provide a seal and piston support which is yieldable for slight misalignment or piston buckling tendencies which occur in operation.

It is a companion object of this invention to provide a single seal element adapted to be the pressurizing intensifier for itself.

It is a related object of this invention to provide a seal piston combination adapted to the filling of the spring and pressurization of the seal.

It is a related object of this invention to provide a means of intensifying a seal member to any predetermined level above liquid pressure.

It is a related object of this invention to provide a seal which extrudes its own guide surface to prevent piston abrasion.

It is a related object of this invention to provide a seal for a liquid spring which cold flows to replace its own wear.

It is an object of this invention to provide improved metering means for a liquid spring shock.

It is a related object of this invention to provide a means of maintaining seal intensification pressure irrespective of reduction of pressure behind a moving dashpot.

It is a related object of this invention to provide a preloaded spring but employing means for elastically balancing a load to avoid impact stress on reversals.

It is a related object to provide means for superintensifying pressures and preload retention.

It is an object of this invention to provide means for filling and preloading a liquid spring.

It is a related object to provide dual seal, filling means for liquid springs.

It is an object of this invention to use ductile metal flow to provide cylinders, cylinder closure retention; and preload; and means for externally preloading the liquid spring to provide a low cost liquid spring.

It is a related object of this invention to provide controlled means for raising preloads to original levels after extensive life.

It is a companion object to accomplish this with simple tools available in any die shop.

It is an object of this invention to provide three sealing means, complementary to each other, in a single seal, whereby the seal is initially mechanical loaded in itself and by the cylinder in which it is interference fit to assure subsequent mechanical intensification for reliable to low cost sealing.

It is the object of this invention to provide a simple cylinder end closure and seal adapted to low cost molding for high volume manufacture and low cost machining for lower volume.

It is an object of this invention to provide a low cost seal adapted to provide a low cost liquid spring shock for a vehicle suspension.

These and other objects will be apparent from the following disclosure.

FIGURE 1 is a side elevation in section illustrating a combination liquid spring shock absorber embodying the basic features of my invention.

FIGURE 2 is a similar side elevation but showing the liquid spring shock under maximum shock load at end stroke illustrating the relative deflection and movement of the parts as well as the position therewith under maximum impact.

FIGURE 2a is a modified view of a variable flow dashpot head varying slightly from that of the device of FIGURE 1 and 2.

FIGURE 3 is a graph showing various shock curve features of the devices of FIGURE 1 through 4a and illustrating how this basic structure can be adapted to provide the variable conditions noted graphically in FIGURE 3.

FIGURE 4 is a side elevation in section of the basic structure as adapted to an extremely low cost variable load liquid spring suitable for the tool and die trade and competitive, price and energy-wise, with coil springs.

FIGURE 4a is an end wall modification of FIGURE 4 after initial liquid loading, to accomplish a varying preloading externally.

FIGURE 5 is an illustration of the modified shock absorber of FIGURES 1 and 2 in its compressed position. The structure adapted to certain sophisticated vehicle suspensions where an extremely low hystresis or seal friction is required and precise dampening is needed.

FIGURE 6 shows the various elements of FIGURE 5 in an unloaded or preloaded position.

FIGURE 6a illustrates an enlarged fragmentary detail of a low-cost epoxy cementing of relative part of this liquid spring.

FIGURE 7 is a side elevation view of a liquid spring adapted to extremely long storage life on the shelf with relatively low cost parts providing a greater intensifying seal element.

FIGURE 8 illustrates a further modified unit adapted to provide a tension-compression configuration for zero impact conditions on machine tools or impact shock buffers.

FIGURE 9 illustrates graphically the low impact balanced spring condition of the device of FIGURE 8.

FIGURE 10 illustrates in detail how the devices with a replenishing feature can be filled externally through a single opening in a liquid spring chamber, and the apparatus required for this.

FIGURE 11 is a sectional view taken along line 11—11 of FIGURE 10 illustrating how relative units can be rotated or retained against rotation.

FIGURE 12 is a sectional view illustrating how the life of the liquid spring is restricted when the surface finish of the relative moving elements is not in the direction of travel.

FIGURE 13 illustrates how, when the direction of surface finish is correct, abrasion and tearing off of the structural sealing element does not take place.

FIGURE 14 is a further modification of this liquid spring to provide high preload pressures when an extremely high spring rate with a short stroke is desired.

FIGURE 14a is a modification of the device of FIGURE 4 to provide the same high preload situation in a low cost spring structure.

FIGURE 15 illustrates yet another means of preload retention of the basic structure disclosed heretofore, in which the piston preload holder is a tension element threaded into a section which is also utilized for retention of the orifice ring of FIGURES 1 and 2.

In FIGURES 1 and 2, I have illustrated a liquid spring shock 20 of novel construction employing a new long pressurized leakage path seal 50. Liquid spring assembly 20 employs a cylinder 21 having a cylinder wall 23, an endwall 22, and an externally threaded extension 24 having an internal cavity 24a which has a thread 24b at one end or full length for the retention of the metering ring 25 or preload stop 890, FIGURE 15, ring 25 is intended to co-operate with metering probe 41 of the dashpot head 40. Dashpot head 40 being further characterized by a second orifice passage 42 of annular construction and an annular liquid passage groove 47 with a series of peripheral holes 43 for taking metered liquid from annular groove 47 into the seal cavity 53 therebehind. Metering being accomplished in this instance by the passage of liquid through metering annulus 42 for as the piston is stroked to the compressed position of FIGURE 2, shock response is influenced by the tapering cylinder wall 23a which provides desired orifice restriction with reduced velocity. As seen in FIGURE 2a a yieldable split metallic or solid plastic piston ring 44 on dashpot head 40 provides a means for sealing the member on the tapered wall while simultaneously preventing binding of the piston as it goes down tapered wall 23a.

The tapered wall 23a can be precisely developed by my method of electrolytically honing cylinder walls by a graded exposure or tapered anode. Still another method is that of forcing the cylinder into an internally tapered holding cylinder then boring and honing mechanically to provide a straight wall while the cylinder is in forced deflection. When the straight walled cylinder is removed from its fixture it then returns to its former configuration, thus providing an internal tapered wall. This then provides a metering configuration in a liquid spring as it is stroked providing shock characteristics such as curve C, FIGURE 3, or as it is desired according to the metering configuration. By choice of materials having different coefficients of friction and elastic deformation, friction dampening can be superimposed on hydraulic dampening. For instance, dampening curve D can be superimposed on shock force "C" as a secondary friction force. A third shock force can be accomplished by the probe 41 entering the metering ring 25, at end stroke, as in FIGURE 2, and as shown in FIGURE 3 graphically as curve E. Curve B of FIGURE 3 is the liquid spring curve due to compression of the liquid. Thus, the curve A represents the actual spring shock curve, the sum of curves B, C, D and E. Dashpot head 40 has a coaxial shank 46 threadedly engaging bore 35 of a liquid spring piston member 30. Piston member 30 is characterized by a guide bore 35 which coaxially receives the piston shank 46 and a threaded section 34 which receives a threaded section 49 of the dashpot head to hold the assembly 30, 40 together. Piston 30 has a refilling or servicing bore 31 which terminates into a smaller bore 33 and a valve or seal 32 between the threaded element 49 and a sealing face 36 at the bore 33 to permit sealing of the bore as piston member 30 is threaded down after pressurizing to seal it much in the nature of an automobile valve cap as will be described hereinafter in FIGURE 10 with respect to filling methods. This design limits openings in the high pressure chambers to one opening carried remote from the pressure wall for maximum availability and uses dashpot head 40 as the check valve at lip 56, as filling is accomplished.

Sealing in this particular spring of FIGURES 1 and 2 and 4 is accomplished with a plastic yieldable member 50 of Teflon, nylon, or Delrin having an annular groove 53 formed therein providing two lips 56 and 57 for sealing the piston 30 and the cylinder surface 23a respectively and providing a long leakage path bore 58. Plastic 50 can be of Delrin, Teflon, or nylon or any good bearing and flowable plastic which incorporates a long leakage passage 58 preferably an interference fit on the I.D. of the cylinder wall 23a by at least .015 per inch of diameter. This then provides a squeeze which is resisted by the cylinder wall 23, which is caused to deflect .001 per inch of diameter to balance the pressure by yield outward and provide with its hoop tension an elastic pressurized condition on the external surface of plug 50 at all times. This small deflection provides a large volume of replenishing from cold flow at piston 30 as it wears. Lip 57 acts to provide an elastic internal preloading on the piston 30 to eliminate initial leakage until the unit is pressurized by its own internal pressure to cold flow the plastic to fill minor surface finish irregularities on the piston surface 37. Lips 57 and 56 act as flexures to follow any slight side load deflection or misalignment of piston 30 to assure continuous pressurization. I have found a solid piece of Teflon tends to gap or elongate on side load and seal leakage begins immediately.

To assure leak free seals over long life cold extruded cylinders finished in the direction of travel are used. With cross hatch or ground surfaces not parallel to seal travel the plastic wears rapidly at high pressures as will be discussed in FIGURES 12 and 13.

In FIGURE 2, I show the compressed position of the spring shock of FIGURE 1 illustrating in dot dash lines how the cylinder is deflected in this case being in the neighborhood of approximately three thousandths at the middle portion and about a thousandth and a half at either end on a unit 1¼" diameter 3½" long. It should be noted that this yielding provides a larger piston area at the lip 57, than is accomplished at its conical base 68 always insuring seal intensification. As noted in FIGURE 2 the energy storage and movement of the seal 50 is shown dotted at 56A, 57A, 53A wherein the seal has compressed 6% at 20,000 p.s.i. due to its compressibility. This working of lip 57A requires that the cylinder wall 23 be linear lapped, cold extruded or otherwise furnished with linear finish lines to prevent seal abrasion and leakage. FIGURE 2 further indicates that both metering orifices 42 and that at 25 are now tightly closed off providing a shock curve A generally flat topped but with a peak at the end as shown in FIGURE 3. This is similar to the automobile bump configuration provided by the rubber bumpers at the end of the automobile shock absorber stroke.

The long leakage path has been tested as a means of sealing and develops a pressure drop like a labyrinth seal by virtue of its length. I have tested a common Teflon slug which will seal until it cold flows into a less elastic mass about 50,000 reversals. Conversely lips 56–57 remain in elastic spring loaded interference with piston 30 cylinder bore 23A for 750,000 cycles of leak free operation. The pressurizing feature of the liquid plus the interference of lips 56–57 and squeeze at 53 due to the elasticity of the steel cylinder and the 30 degree pressurizing angle 68 of the end closure 69 all cooperating for long seal life. As plastic seal member 50 is driven up angle 68 it replenishes its wear for perfect leak-free long cycle life. It should be noted that plastic 50 can be caused to flow into guide cavity 65 of end closure 69 as shown in FIGURE 13 to provide bearing for side loads on piston 30 this same flowable condition down the angle 68 also causes seal replenishment due to wear with the U type integral pressurizing piston 50 having lips 57–58 and cavity 53. The seal and integral pressurizing piston 57–58 and cavity 53 acting to cold flow the plastic at bore 58 to always assure a tight sealing surface in greater interference pressure-wise than the liquid it contains. The pressure angle 68 being 30 degrees the seal 50 exerts a sealing pressure at bore 58 up to a maximum 1.6 times the liquid pressure due to this pressure angle 68. This seal then maintains an initial pressure because of the intereference fit in cylinder wall 23 and piston 30 and sealed in a lips 56–57 and an intensifying seal pressure because of the angle 68, thus, providing 750,000 leak-free cycles for liquid springs. This life is ⅓ greater than the life of a rear leaf spring of a vehicle under maximum cycles and, 12 times that of a vehicle shock absorber.

FIGURE 13 is a greatly enlarged fragmentary view of this seal area showing the plastic 50 extruded into the guide clearance 65 with linear finish 30 on the piston 30. In FIGURE 12, the extrusion of the plastic 50 into the guide clearance 65 is breaking up and disintegrating seal 50, forming a poor seal because of the circumferential finishing 30" of the piston 30. These are actual test results where linear finishing lasted 7 to 1 over circumferential finish.

Cap 69 can be of a structural bearing alloy such as beryllium copper or Navy Phosphor bronze for high cost aerospace uses as liquid springs to avoid scoring the piston rod 30 in the event of a side load, piston buckling tendencies or deflection. It can have a silver or copper plated bore.

For low cost springs a permissible plastic cold flow such as at FIGURE 13 is desirable. It has been noted that Teflon will cold flow to a specified position orienting as molecules to increase its own strength whereby it resists further cold flow. This produces a low cost high strength barrier to further cold extrusion of the softer Teflon from which it cold flowed its high strength section. To avoid scoring the piston on excessive side loads, an exit venturi like shape 65a can be employed. This permits seal 50, piston 30 to deflect, or tend to buckle slightly which the seal can accommodate, so the hard piston 30 will not score by rubbing contact on cap 69 and the lip 50a acts as a wiper for the piston 30.

While I have shown seal 50 in contact with the cylinder wall 23a it should be understood that seal 50 can be recessed in a solid end wall of a much larger cylinder where it would only be in contact with a seal bore or recess. While I have not shown such a structure it is obvious that so long as the proportions of seal length, angle and lips are followed the structure shown will function equally as well in such a large spring. It should be noted that 90% of the production is in springs of less than 3″ diameter so that in most instances the seal configuration shown in the drawings, where the seal rests on the cylinder wall, would most generally be used.

The seal principles disclosed herein have the features of a three element seal in a single homogeneous molding or machining of plastic. One section being a flexible U type cup seal but with long thin flexible lips elastically yielded in sealed contact to the piston and cylinder, integral with a body section in actual interference fit with a seal cavity or cylinder and the piston, terminating in a third conical section adapted to wedge sealing and seal replenishment from internal pressure.

In FIGURE 2A, I illustrate a version of dashpot head 40a characterized by a plurality of orifice holes 47a which is controlled as to flow by the ring 44 which as it is reduced in diameter restricts the orifice flow through holes 47a by reducing their cross sectional area as ring 44a is reduced in diametrical size by traveling down taper 23a.

FIGURE 4 is a version identical to that of FIGURES 1 and 2 except that it is just a liquid spring providing the curve B of FIGURE 3. The primary difference is that this piston 430 is a single hollow rivet having a riveting extremity 436 with a shank 434 and base 435 which is riveted over at 437, a stamped preload retention collar 440 having a drawn bore and shoulder 446 engaging shank 434 and formed seal engaging stop 447. This then produces an extremely low cost piston assembly for a low cost pure liquid spring such as for the tool and die trade. It should be noted that stamping 440, piston 430 provide an unused space gap 470, on piston 430, which provides a section of piston 430 for holding when superlinear-finishing and for possible distortion on riveting. An anti-extrusion collar 451 of high strength plastic or bearing alloy is employed to assist in preventing any loss of seal 450 over long life. Since it is a more spring like material it can have greater interference on shaft 430 and act as a wiper for external dirt on shaft 430. It also prevents abraded seal particles from escaping to reduce spring forces.

Cylinder 420 is caused to be yielded by rolling a retaining collar or groove 425 into groove 463 of the cylinder end closure 460 to retain it herewith. This construction is about ⅓ the cost of precision threading the respective elements. This also acts to retain a spanner wrench, engaging holes 426 for threading 420 into a socket.

Since positioning of end closure 460 is difficult with respect to liquid volumes and thus preloads on piston 430, I propose to yield the stud end 480 at 490 by impressing with a ball or ball end tool to get a specific preload on piston 430. This can be used to develop specific preloads initially or after cycle life by the choice of balls and the depth. Thus any toolmaker can increase the preload without risking seal leakage. The wall yields mechanically cold to hold 20,000 p.s.i. without losing its mechanical set.

FIGURE 4a illustrates that rolling the cylinder 420 at 491 can also accomplish this. In both instances metal having a yield of 150,000 p.s.i. is yielded providing a constant high pressure source to the seal 150 to keep it intensified in sealing contact at 190 with piston rod 130.

FIGURE 5 illustrates another version of this device at its end-stroke indicating how the metering is closed off. It should be noted that this seal with its long seal lips 156, 157 provides low friction characteristics with a pressurized long leakage path for very low friction and long life. Since in this unit interference at piston surface 190 is minimized to provide low friction, such as for a long stroke vehicle suspension, we have utilized a nylon anti-extrusion member 158 which is not subject to the angular intensification of angular anti-extrusion member 451 of FIGURE 4 but still prevents extrusion.

It is well to note here that in an actual automobile shock absorber having a 6″ stroke and providing a supporting spring load of 800 pounds and a shock force of 2,000 pounds per wheel with a spring rate of 90 pounds per inch, the column strength of piston 130 is critical. High strength elastic metal alloys will just accomplish this on a ⅜ shaft 6″ long without permanent buckling. However, column deflection and rippling and buckling tendencies are to be expected from shock loads. In an existing shock absorber, for such use, the shock shaft is generally one-half inch in diameter and a very soft elastomeric seal is used to follow such shaft deflections. The more rigid plastics used here would customarily not follow except for the long lip 157 which is in elastic interference with the shaft at 151 and follows it through such deflections. Actually, the solid section at the radiused and conical angled surface acts as a ball joint to allow this slight bending or deflection of piston 130 while still sealing it tightly.

Actually this is an important feature of seals 50 and 450 in FIGURES 1 through 4, 14a and 15 in that even short stroke slim pistons have this deflection and harmonic rippling or vibration on impact which must be accommodated by the seal. Thus the solid and conical seal section behaves like a ball joint for minor deflections while the lips 158–158 follow the deflecting rod.

FIGURE 6a is an enlarged fragmentary view of the seal end of the liquid spring 120 showing the epoxy resin 121′ confined between a counterbored area 121″ of the cylinder and an enlargement 160′ of the end closure 160.

In FIGURE 7, I show a pure liquid spring 220 without the shock characteristics of metering and characterized by the piston preload retention device 240 which is in effect similar to dashpot head 140 and 40 except that it does not have any metering portion. Preload device 240 has an upstanding shoulder 241 and annular flange 241′ bearing on sealing configuration 250. This sealing configuration 250 comprising an outer sealing wedge member 251 and an inner sealing member 252 having tapered surfaces 253 and 254 respectively said sealing surfaces wedging against the steel outer cylinder 221 and against the piston 230 along leakage path 290. This device has the characteristic of intensifying pressurization of the seal at all times against the piston shaft 230 and the wall 221 by wedging action as deflection and wear takes place along leakage path 290 and assures at all times an interference on piston member 230 in excess of the liquid pressure in the chamber. Further modification of this wedge type part providing the sealing is characterized by the reversal of the angle.

If the angle of wedge is 30° as in FIGURES 1, 2, 4 and 8 the ratio of piston seal pressure to liquid pressure is 1.6 to 1. If 45°, as in FIGURES 5 and 6, it is 1 to 1. If 15° as shown in FIGURE 7, it is 2.1 to 1.

In FIGURE 8 the seal having the pressurizing angle bears against the end member 351 which can be the steel end closure or a separate plastic piece. Initial and intensifying pressurization, is through means of an O ring elastomeric seal 352 formed in a retention groove therein. This device is further characterized by the ability to provide wear replacement as it extrudes to replace wear from the bore 353 against piston 330 at all times. It should be noted that face 341 of head 340 is impressed into elastic plastic seal member 350 to provide an elastic balancing spring condition whereby slight tension loading can be accomplished or zero impact condition in event of an impact condition in compression. Such a shock condition is desirable in a preloaded liquid spring. Slope F of the graph of FIGURE 9 illustrates this principle. Slope F' illustrates how a tension load is handled elastically by seal compression.

In FIGURE 10, I illustrate a means of filling the devices of the previous drawings in which a filler cap 300 having a bore 301 and a Teflon guide seal 302 is caused to fill through the piston members 30, 130, 230, by sealing contact thereof and to retain pressure as the pressurizing liquid flows through the valve element of pistons 30, 130 and 230, elements are shown with the pistons 30, 130, 230 threadedly backed off from the end stop member 240 that acts as a check valve to prevent the liquid normally from going out of the cylinder. Pressure therein enters through the bore 431 of piston members 30, 130 and 230 and unseats the safety Teflon cap seal 432 forcing the liquid down through the threaded element and lifting the pressurizing cap off its seat and permitting the preloading of the unit to any desired pressure. It will be noted that this can be done with a separate element or it can be done with a unit which is thereafter caused to engage the spring as a separate entity. Referring also to FIGURE 11, a downwardly formed lug 543 on cap 540 engages an interruption 550' in the annular groove 555 in seal 550 to hold it against turning like a wrench does while piston 230 is turned by a strap wrench.

As discussed herein before, FIGURES 12 and 13 illustrate a very essential ingredient of the piston 30, seal 50 retainer 69 combination. Liquid spring pressure against seal 50 causes it to wedge against surface 68 assuring a higher pressure between seal 50 and piston rod 30. This therefore, then eliminates leakage. However, semi-rigid plastics such as Teflon have a tendency to cold extrude and abrade because of their softness. In the spring shown in FIGURES 1 and 2 and others a circumferential finish shown by the lines 30" chews the seal up and extrudes it through cap 65 as shown in FIGURE 12. This is true even though the surface finish is under .05 micro finish. The spring under such configuration is rendered useless under 100,000 cycles. Referring now to FIGURE 13, the Teflon gland 50 has cold extruded partially into groove 65 of cap 69 and formed a thin high strength lip 50a which with the piston rod linear finished as in 30' does not abrade. A sealed piston rod conception of this configuration has reached 750,000 cycles or 7 to 1 over that of the 100,000 cycles of FIGURE 12.

In FIGURE 14 I illustrate a method of obtaining a high preload by forming an upstanding shoulder 667 on cap member 668 which retains seals 650. Supplementary elastomer 669 seals cap 668. Shoulder 667 bears on piston head 640 to take high preload which the plastic 650 will not contain without extrusion.

FIGURE 14a illustrates in a fragmentary section, a preload retention device 767 which has a circumferential groove similar to the manner cap 450 is retained in FIGURE 4. A similar yielded cylinder head 725 holds cap 767 against the preload head of piston 740. Still another method of holding high preloads is illustrated in FIGURE 15 in which a piston head 840 is herein retained by tubular stop member 890 which threadedly engages cylinder 720 at thread 724 with its threads 891 being adjustable therein to provide for specific length on piston 720. A plurality of orifices 893 permit exhausting liquid from chamber 895 and allow flow therethrough.

I claim:

1. A liquid spring including a cylinder, a cylinder end closure fixed to said cylinder and having a piston clearing bore therethrough and an internal conical pressure angle, a plastic seal member in interference seal fit with said cylinder and having a bore co-axial with said end closure, said seal member bore having a lesser diameter than the bore of said cylinder end closure, said seal member having a conical complementing pressure angle in juxtaposition to said end closure, and a piston member extending through said bores having a clearance fit to said cylinder end closure bore and an interference fit to said plastic seal member bore.

2. A liquid spring including a closed cylinder, a cylinder end closure fixed to said cylinder and having a piston bore therethrough and an internal conical pressure angle, an annular anti-extrusion ring in juxtaposition with said cylinder end closure, a plastic seal member in interference sealed fit with said cylinder and having a bore coaxial with said end closure, said seal member bore having a lesser diameter than the bore of said cylinder end closure, said seal member having a conical complementing pressure angle in juxtaposition to said end closure, and a piston member having a slip fit to said cylinder end closure bore and an interference fit to said plastic seal member bore.

3. The liquid spring of claim 1 further characterized in that said sealing member bore engages said piston member for a length at least equal to three times the diameter of said piston member.

4. The liquid spring of claim 3 further characterized in that said plastic sealing member has an inner sealing lip engaging said piston member and an outer sealing lip engaging said cylinder.

5. The liquid spring of claim 4 further characterized in that each of said sealing lips has a substantial thickness along its length.

6. In a liquid spring having a piston rod longitudinally movable in a cylinder, a plastic sealing member having a sealing bore extending therethrough, said rod extending through said sealing bore, a conical pressure face formed on one end of said member, and an end closure in the cylinder, said end closure having a conical pressure face cooperating with said face of said member to cause intensified seal pressure as liquid pressure increases in the spring and replenish plastic worn in said sealing bore by reciprocation of said rod.

7. In the liquid spring of claim 6, a pair of sealing lips formed on the other end of said sealing member, one of said sealing lips engaging said rod and the other of said sealing lips engaging said cylinder, each of said sealing lips having a substantial thickness along its length.

8. In the liquid spring of claim 7, said plastic sealing member including a section between said conical face and said sealing lips which is in interference fit between the piston rod and the cylinder from elastic deformation.

9. In a liquid spring having a piston rod longitudinally movable in a cylinder, a plastic sealing member having a sealing bore extending therethrough, said rod extending through said sealing bore, a conical pressure face formed on one end of said member, an end closure in the cylinder, said end closure having a conical pressure face cooperating with said face of said member to cause intensified seal pressure as liquid pressure increases in the spring and replenish plastic worn in said sealing bore by the reciprocation of said rod, and an anti-extrusion ring encircling said rod and having a conical face and engaging said member where the rod passes through a bore in said end closure.

10. In the liquid spring of claim 9, said anti-extrusion ring being fabricated of a plastic which is structurally denser and stronger than the plastic of said sealing member.

11. In the liquid spring of claim 10, said extrusion ring being fabricated of bearing metal.

12. In a liquid spring having a piston rod longitudinally movable in a cylinder, a plastic sealing member having a sealing bore extending therethrough, said rod extending through said bore, said sealing member having a radially elastic section at one end and a central section in interference fit with said rod and said cylinder, the interference fit between said central section and said cylinder being so extensive as to elastically deform said cylinder on the order of approximately .001 inch.

13. In the liquid spring of claim 12, the sealing member having a conical pressure face formed on its other end, and an end closure in the cylinder, said end closure having a conical pressure face cooperating with said face of said member to cause intensified seal pressure as liquid pressure increases in the spring and replenish plastic worn in said sealing bore by reciprocation of said rod.

14. In the liquid spring of claim 13, the radially elastic section of said sealing member comprising an inner sealing lip engaging said rod and an outer sealing lip engaging said cylinder, said sealing lips being of substantial thickness along their length.

References Cited by the Examiner

UNITED STATES PATENTS

| | | | |
|---|---|---|---|
| 1,381,942 | 6/1921 | Stewart | 277—190 |
| 1,867,045 | 7/1932 | Young et al. | 277—212 X |
| 2,230,725 | 2/1941 | Nathan | 277—205 X |
| 2,613,962 | 10/1952 | Dahl | 277—212 |
| 2,643,112 | 6/1953 | Smith | 267—64 |
| 2,671,297 | 3/1954 | Arms | 51—59 X |
| 2,708,573 | 5/1955 | Rovoldt | 267—64 X |
| 2,733,060 | 1/1956 | Taylor | 267—64 |
| 2,751,216 | 6/1956 | Taylor | 267—64 X |
| 2,771,968 | 11/1956 | Mercier | 267—64 X |
| 2,960,332 | 11/1960 | Lindow et al. | 267—64 |
| 3,076,643 | 2/1963 | Bittel | 267—64 |

FOREIGN PATENTS 21,599  7/1961  Germany.

EUGENE G. BOTZ, *Primary Examiner.*

ARTHUR L. LA POINT, *Examiner.*

W. B. WILBER, *Assistant Examiner.*